UNITED STATES PATENT OFFICE.

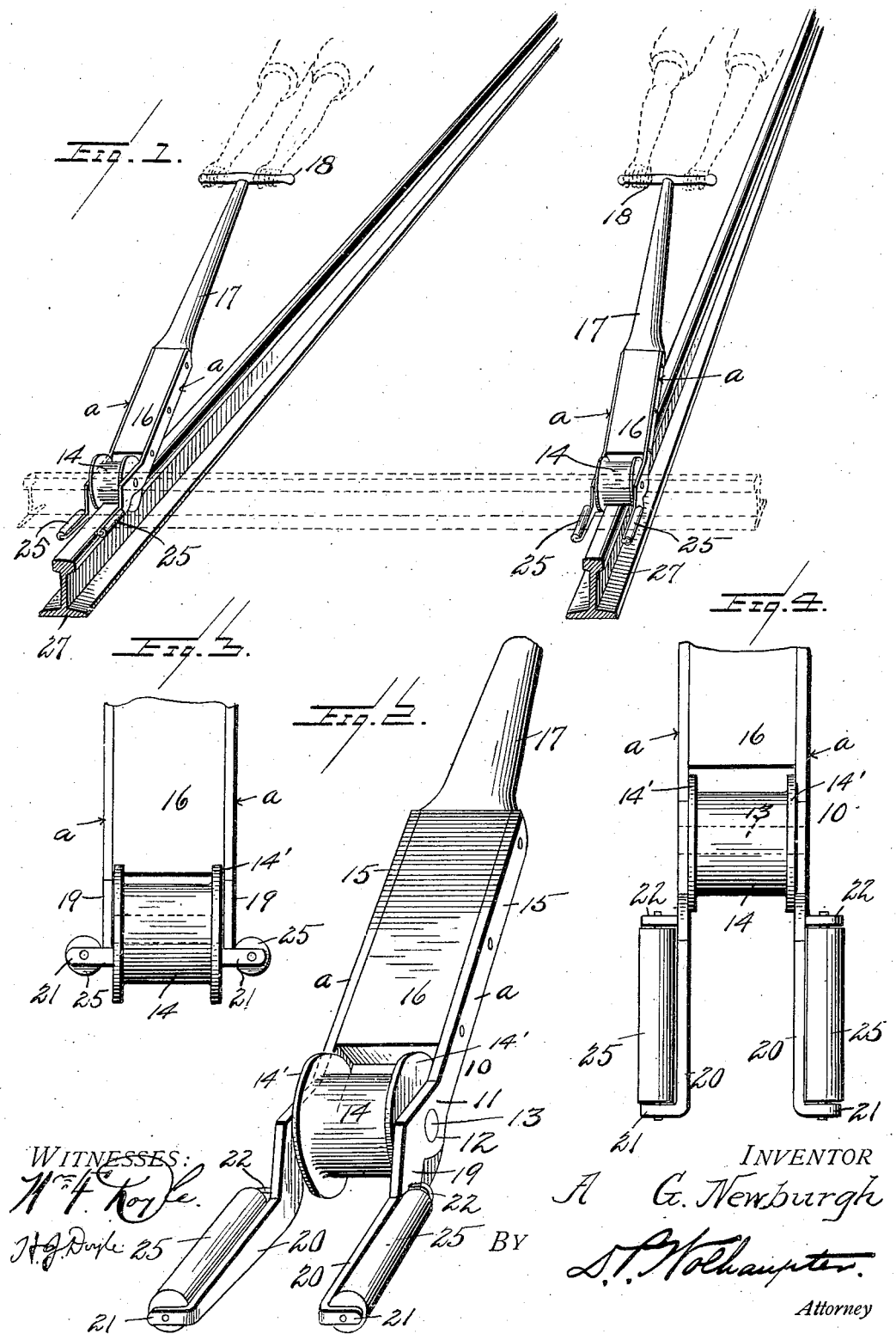

ANDREW G. NEWBURGH, OF SUPERIOR, WISCONSIN.

RAIL-HANDLING TRUCK.

No. 877,111.  Specification of Letters Patent.  Patented Jan. 21, 1908.

Application filed August 13, 1907. Serial No. 388,337.

*To all whom it may concern:*

Be it known that I, ANDREW G. NEWBURGH, a citizen of the United States, residing at Superior, in the county of Douglas and State of Wisconsin, have invented certain new and useful Improvements in Rail-Handling Trucks, of which the following is a specification.

The present invention consists in certain new and useful improvements in trucks for handling railroad rails, structural steel girders, and other heavy material.

The principal object of the invention is to provide a truck of the type referred to in which means are provided for quickly and easily handling heavy material, such for instance as in loading and unloading boats or cars, and in building operations where the material is to be moved to various locations.

With this and other objects in view, the invention consists in a hand truck the handle portion of which is in the form of a lever bar having attached thereto a carrying frame in which is mounted a supporting and traveler wheel, preferably adapted for use in connection with rails, the said carrying frame being also provided with novel means for supporting the material to be transported.

In the accompanying drawings I have shown a preferred embodiment of my invention and in the following detailed description thereof like characters of reference refer to corresponding parts.

In said drawings—Figure 1 is a perspective view, showing my novel truck system of handling heavy material. Fig. 2 is a similar view of one of the trucks on a larger scale than Fig. 1, the end of the lever bar being broken off. Fig. 3 is a front view of the carrying frame, showing a portion of the lever bar. Fig. 4 is a top plan view of the structure shown in Fig. 3.

Referring to the accompanying drawings 10 designates a carrying frame composed of two side members *a—a* spaced apart, and each provided with an enlarged body portion 11 in which is formed a bearing opening 12 for the reception of an axle 13 of a supporting and traveler wheel 14. Each of said side members *a* has a rearwardly extending strap portion 15 which is disposed at an inclination relatively to the body portion 11 and preferably reduced in size, and between the opposite strap portions the enlarged end 16 of a lever bar 17 is placed and rigidly secured thereto by means of bolts or other suitable fastening means. The outer end of said lever bar 17 may be provided with a horizontally arranged handle 18, to facilitate handling of the truck.

By referring to Fig. 2 of the drawings, it will be observed that each of the body portions 11 of the carrying frame 10 has a depending or drop portion 19 from which projects a longitudinally extending arm 20. Each of these arms is provided on the outer side thereof with an offstanding pair of bearing ears 21 and 22 provided with bearing openings for the reception of the spindle extremities of a longitudinally arranged supporting and rest roller 25 interposed between the ears. The outermost of said bearing ears are preferably formed by lateral deflections of the arms 20, and said rollers 25 are held by the bearing ears in parallel relation to the arms 20 and having their upper surfaces projecting above the plane of the top edges of the arms, so that the rail, girder, beam, or other heavy material supported across the carrying frame on the oppositely located rollers 25 can be easily skidded off from the truck.

In Fig. 1 of the accompanying drawings the invention is shown in use, wherein the trucks may run upon rails 27 and as a safeguard, the supporting and traveling wheel is provided with side flanges 14', which retain it upon said rail. The system of handling the material as illustrated in said figure is the preferred one where large cargoes or the like are to be transported, but it will be obvious that the rails 27 may be dispensed with, in which case the supporting and traveler wheel need not necessarily be provided with the flanges 14'.

In using the trucks as in the preferred embodiment shown in Fig. 1 of the accompanying drawings, they are placed upon the rails 27 and the material to be transported is placed across the longitudinally arranged rollers 25 of the arms 20, and the trucks are then pushed to the point at which the material is to be unloaded. By means of the longitudinal mounting of said rollers 25, the material may be quickly and easily removed from the said arms and conveyed to a point where it will not interfere with the further use of said rails 27. And it will be observed that the material may be raised or lowered by means of the lever bar 17, the supporting and traveler wheel 14 serving as a fulcrum for such raising and lowering movements.

I claim as my invention:

1. A truck consisting of a lever bar, a carrying frame secured to said lever bar, a supporting and traveler wheel journaled in said carrying frame, and longitudinally arranged supporting and rest rollers carried by said carrying frame.

2. A truck consisting of a lever bar, a carrying frame having arm extensions, a supporting and traveler wheel journaled in said carrying frame, and supporting and rest rollers journaled on said arm extensions.

3. A truck consisting of a carrying frame having longitudinally disposed arms, a lever bar carried by said frame, and a supporting and rest roller journaled on each of said arms.

4. A truck consisting of an angularly shaped frame having longitudinally extending arms, a supporting and traveler wheel journaled in said frame, and a supporting and rest roller mounted on each of said longitudinally extending arms.

5. A truck consisting of a carrying frame comprising side members angularly shaped and having a supporting and traveler wheel journaled therein, a longitudinally extending arm carried at one end of each of said side members, supporting and rest rollers journaled on each of said arms, and a lever bar carried by the opposite ends of said side members.

6. A truck consisting of a carrying frame, a supporting and traveler wheel journaled therein, a lever bar carried by said frame, and rest rollers projecting from said frame and arranged to have a transverse movement relative to said supporting and traveler wheel.

7. A truck consisting of a carrying frame, a supporting and traveler wheel journaled in said frame, a lever bar carried by one end of said frame, arms extending from the opposite end of said frame, and a roller journaled in each of said arms and adapted to have a transverse rotation relative to said supporting and traveler wheel.

8. A truck consisting of a carrying frame composed of side members, a supporting and traveler wheel journaled between said side members, a lever bar rigidly secured between the rear ends of said side members, an arm extending from the forward end of each of said side members and provided with offstanding bearing ears, and a roller journaled in each of said bearing ears of said arms and adapted to have a transverse movement relative to said supporting and traveler wheel.

In testimony whereof I hereunto affix my signature in the presence of two witnesses.

ANDREW G. NEWBURGH.

Witnesses:
A. R. COLE,
H. FORSLUND.